United States Patent [19]

Stolov et al.

[11] Patent Number: 4,580,876
[45] Date of Patent: Apr. 8, 1986

[54] SUBSTRATUM FOR LIQUID CRYSTAL DISPLAYS

[76] Inventors: Michael Stolov; Adi Stolov, both of 25 Hapoel Street, Nof Yam, Israel

[21] Appl. No.: 552,379

[22] Filed: Nov. 16, 1983

[30] Foreign Application Priority Data

Nov. 2, 1983 [IL] Israel .................................. 70115

[51] Int. Cl.⁴ ............................................. G02F 1/133
[52] U.S. Cl. ................................. 350/339 R; 350/335
[58] Field of Search ................... 350/334, 339 R, 345, 350/331 R, 332

[56] References Cited

U.S. PATENT DOCUMENTS

| 3,861,783 | 1/1975 | Dill et al. ............................. 350/344 |
| 3,973,388 | 8/1976 | Yoshida et al. .................. 350/334 X |
| 4,025,162 | 3/1977 | Yagi ..................................... 350/334 |
| 4,056,306 | 11/1977 | Misono et al. ...................... 350/334 |
| 4,130,408 | 12/1978 | Crossland et al. ............... 350/344 X |
| 4,183,629 | 1/1980 | Nishimura et al. ............. 350/331 R |
| 4,408,836 | 10/1983 | Kikuno ............................ 350/336 X |
| 4,436,377 | 3/1984 | Miller ................................... 350/345 |

FOREIGN PATENT DOCUMENTS 0018697 2/1979 Japan ..................... 350/334
0136616 8/1982 Japan ..................... 350/334

OTHER PUBLICATIONS

Brody et al., "A 6×6 Inch 20 Lines-per-Inch Liquid Crystal Display Panel", IEEE Transactions on Electron Devices, vol. ED-20, No. 11, Nov. 1973, pp. 995–1001.

Primary Examiner—John K. Corbin
Assistant Examiner—David Lewis
Attorney, Agent, or Firm—Fleit, Jacobson, Cohn & Price

[57] ABSTRACT

There is provided a transparent substratum structure for use in the construction of large-size liquid crystal displays, consisting of a triple layer structure of a thick transparent sheet, a resilient elastic layer, and a thin glass plate bonded to said elastic layer. The sheets may be bonded by a transparent elastic glue, and the thin glass plate is generally about 0.1 to 0.6 mm thick.

There are also provided large-size back-to-back twin liquid crystal display panels consisting of two outer transparent thick sheets and two thin glass sheets separated by a thin elastic transparent layer with liquid crystal layers between said thick and thin plates, forming an integrated structure, with a polarizer between the thin glass plates, in addition to the resilient layer.

14 Claims, 3 Drawing Figures

SUBSTRATUM FOR LIQUID CRYSTAL DISPLAYS

FIELD OF THE INVENTION

The invention relates to improvements in liquid crystal displays. There are provided integrated structures for use in large-scale liquid crystal displays which considerably improve the performance of same. The large-scale liquid crystal displays made possible by the present invention are of importance for use in matrix screens in computer industry and can be used in measuring instruments, electronic games, advertising displays and the like.

BACKGROUND OF THE INVENTION

The size of conventional liquid crystal displays is rather restricted. It has hitherto not been possible to produce large liquid crystal displays consisting of large integral glass plates as these are not of an adequate quality as regards the required flat surface which is imperative in order to ensure an even distance between the plates between which the liquid crystal is arranged at this must be of a certain uniform thickness, the absence of which affects adversely the quality of the display. The structures of the invention (termed "substratum"), make possible the mass production of large size liquid crystal displays of high quality.

SUMMARY OF THE INVENTION

According to the invention there is provided an integrated sandwich construction, termed "substratum" for use in large scale liquid displays, which makes possible the construction of large scale liquid crystal displays of high quality.

The term "large scale" is intended to define structures which are larger than hitherto possible employing flat integral glass plates. Generally this term defines displays of the order of about 10 cm by 10 cm, but much larger displays can be produced without difficulty.

The integrated sandwich constructions of the present invention consist essentially of three bonded layers of desired dimension namely a flat transparent sheet of adequate thickness to provide for rigidity and mechanical strength, a layer of an elastic transparent material and a further very thin glass plate bonded to said elastic layer. In a liquid crystal display such integrated structure is applied on top of the liquid crystal layer which is supported by another thick transparent sheet, preferably a glass sheet, there being provided spacing means and electrodes on said thin glass plate and on the support plate which are in contact with the liquid crystal. The combination of the resilient, elastic layer with the thin glass plate provides for a close and even contact of the said "sandwich structure" with said liquid crystal supported by another flat plate, resulting in said liquid crystal being in touch with both adjacent plates all over the surface thereof, there being provided an even distance between opposing electrodes and even thickness of the liquid crystal, substantially improving the performance of the display.

The three layers of the said substratum are hermetically cemented together by suitable means such as conventional adhesive. When this is used to form with a liquid crystal layer supported by a flat glass plate a liquid crystal display, providing for the required electrodes and spacers, the substratum and the said other components are secured with each other by suitable means, such as a suitable frame in the dead spaces of the pattern.

In order to indicate suitable sizes of the components the following guidelines are given:

a. The support plate is a large transparent plate, of glass or plastic, of adequate thickness to provide for mechanical strength and rigidity, for sheets of say 10×10 cm, a thickness of the order of 3 mm to 5 mm may be used. For a size of say 20×30 cm, a thickness of about 5 mm by 7 mm may be used, b. The elastic transparent layer is made of a suitable rubber or similar compound having the required mechanical properties. Generally a thickness of from about 0.4 mm to about 0.7 mm will give satisfactory results;

c. The thin glass sheet is to be self-supporting, it ought to be as thin as feasible. Generally for displays of about 10×10 cm a sheet of about 0.1 to 0.6 mm, preferably about 0.2 mm to about 0.5 mm thickness will give satisfactory results. For larger displays a thickness of about 0.3 to about 0.6 mm will be satisfactory. The thin glass plate is sandwiched in the final structure between the elastic layer to which it is bonded over its entire area and the liquid display (with the electrodes and spacers) said spacers being the actual support and they also define the distance.

The three sheets are preferably hermetically bonded by a transparent elastic glue; resulting in a mechanically strong structure. Towards the outside the thick sheet provides firmness and rigidity. Towards the liquid crystal the structure is adequately resilient so as to provide for a close contact with the spacers, resulting in a uniform spacing of the electrodes of high accuracy. The liquid crystal is generally about $7\mu$ to $10\mu$ thick, preferably about $8\mu$.

Thus, spacers of suitable intervals with such height will provide for the required uniform spacing.

The invention is intended to extend to all arrangements based on transparent structures comprising a rigid support, a resilient layer and a thin transparent sheet adapted to adjust itself to the contours of a liquid crystal supported by a support sheet which is not entirely flat.

DESCRIPTION OF THE PREFERRED EMBODIMENT

The invention is illustrated with reference to the enclosed schematical drawings, which are not according to scale as regards the various components and thickness and extent of these, wherein.

Figure 1:
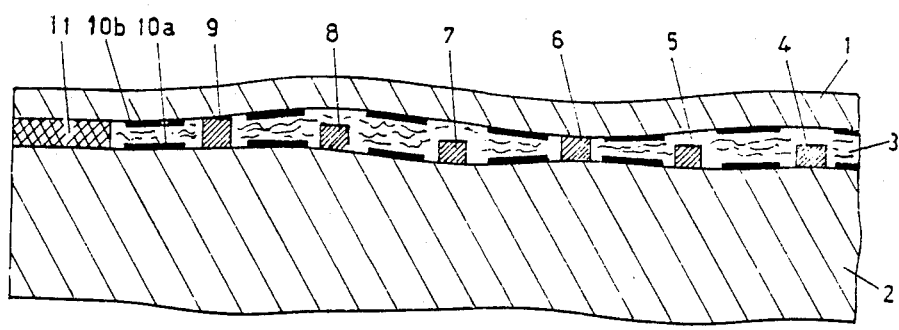
FIG. 1 is a sectional view of part of a conventional liquid crystal display, illustrating the problems of conventional liquid displays (not part of the invention)

The conventional liquid crystal display of FIG. 1 consists of a glass plate 1, serving as cover plate and a support glass plate 2, between which there is arranged the liquid crystal layer 3, there being provided a plurality of spacers 4 to 9, which define the desired thickness of the liquid crystal layer 3, there being provided electrodes 10a to 10b respectively on glass plates 1 and 2 respectively. The uneven nature of the support plate 1 is shown in an exaggerated manner, and when the components are sealed by means of the frame 11 (only the left hand end being shown), due to the uneven nature of the support sheet 2, at some places like around spacers 4 and 5, 6 and 7, 7 and 8, and 8 to 9, the desired distance defined by the height of the spacers is not maintained, and the liquid crystal layer will be of uneven thickness resulting in a different distance between the electrodes at various locations. Without spacers the too small distance may manifest itself as rainbow colors, or even as shorts between opposite electrodes. It has been proposed in literature to use as cover plate a thin glass plate with spacers as shown in FIG. 1, but this does not result in an even spacing due to the uneven nature of large glass plates. This results also in the slowdown of switching time where the liquid crystal layer is too thick, and by rapid multiplexing it is possible that no switching will take place at all. Large thin glass plates in such structures are liable to be broken due to the vibrations or other stresses to which such arrangements are exposed.

The novel substratum, i.e. the sandwich structure of the present invention eliminates to a large extent the drawbacks of conventional structures and ensures an even uniform liquid crystal layer.

Figure 2:
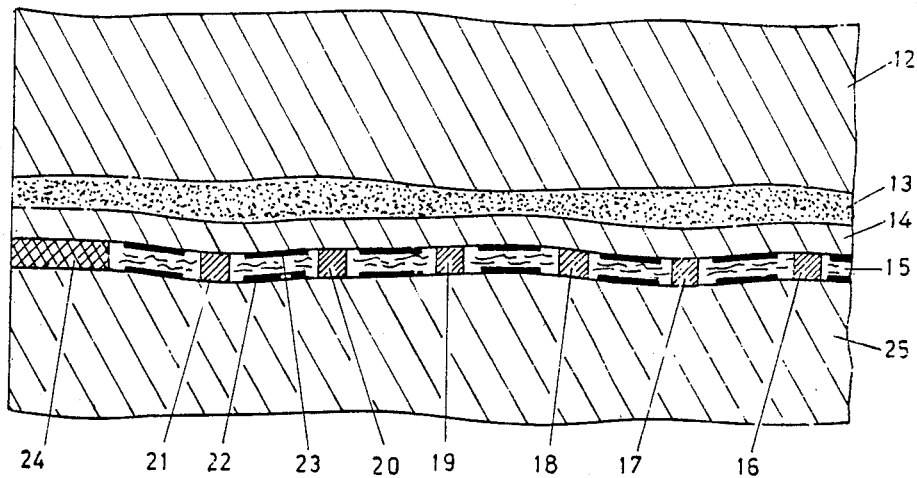
FIG. 2 is a partial sectional view through a liquid crystal display of the invention.

The embodiment illustrated in FIG. 2 comprises a triple-layer substrate sandwich construction comprising the base plate 12 which is a thick firm glass or plastic plate to which there is attached the transparent resilient elastic layer 13 which is covered with the thin glass plate 14 attached over its entire area to said layer 13. This structure is firm, and towards the outside of the liquid crystal display, the upper surface of the plate 12 presents a rigid structure. The lowermost layer of thin glass plate 14 is provided with a plurality of electrodes 23.

The triple-layer structure is attached to the lower part of the display structure which comprises a transparent glass plate 25 provided with a plurality of electrodes 22, and which supports the liquid crystal layer 15, there being provided a plurality of spacers 16 to 21 of the same height, which defines the spacing between the plates 14 and 25. The two assemblies are attached with each other by means of sealing frame 24, only the left-hand side of which is shown in the Figure. Due to the resilient nature of the layer 13 and the fact that glass plate 14 is a very thin one (of the order of 0.2 to 0.5 mm, for sizes of up to about 20×30 mm), the glass plate 14 is able to adjust itself to the contours of the lower plate 25, expressed by the spacers 16 to 21, so that said plate 14 is in firm contact with each of the spacers, resulting in a uniform spacing all over the surface of the liquid crystal 15, resulting in an identical distance between the opposite electrodes 22 and 23 all over the panel. The liquid crystal is generally about a thickness of $8\mu$, and this is maintained all over the surface of the liquid crystal layer. The distance is maintained during various conditions of operation, and due to the provision of the resilient layer 14 the thin glass plate is protected and will withstand mechanical stresses without deformation or breakage. Such liquid crystal display panels can be produced in this manner up to sizes which were hitherto infeasible with integral glass plates.

The arrangement according to the invention is applicable to the production of transmissive, reflective and transflective liquid crystal displays, of large size.

Figure 3:
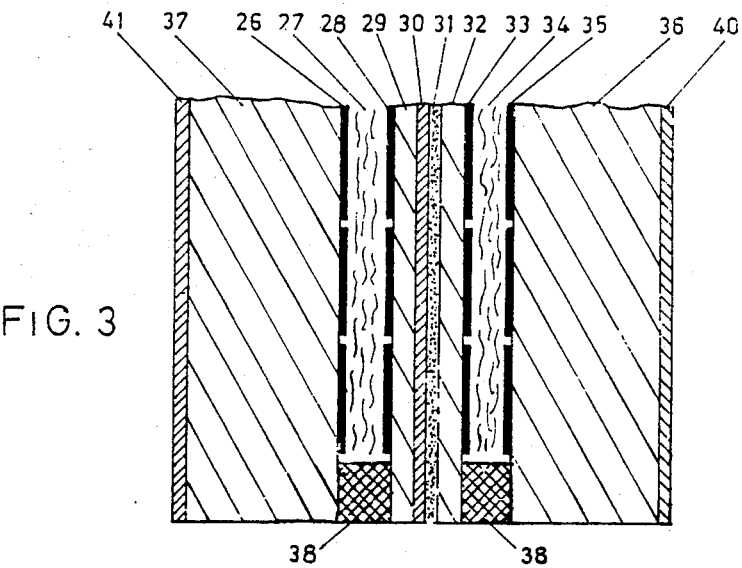
FIG. 3 is a partial sectional view through a twin-layer liquid crystal display of the invention.

FIG. 3 illustrates another embodiment of the invention, consisting of a combination of two liquid crystal displays in an integral unit. This twin-display comprises in combination outer thick glass plates 36 and 37, on which there are provided respectively transparent electrodes 35 and 26, the inner surfaces of the two plates being in contact with liquid crystals 34 and 27, respectively, which are in touch with thin glass plates 32 and 29, respectively, to which there are attached transparent electrodes 33 and 28, respectively. A resilient elastic transparent layer 31 is provided between the two glass plates, while 30 designates a polarizer. In constructions wherein the liquid crystal substance is of the twisted nematic type, there are advantageously provided external polarizers 40 and 41, respectively, on the outer surfaces of the sheets 36 and 37. For large displays there are provided spacers between the plates 36 and 32, and plates 37 and 29, which are of the type shown in FIG. 2, but which are not shown in this Figure, and which define the spacing and thus the thickness of the liquid crystal layer. Due to the provision of the elastic layer 31, the thin glass plates adapt themselves to the said spacers and result in a uniform spacing between the electrodes facing each other.

With such twin-displays positioned back-to-back, interesting phenomena have been discovered:

a. When the liquid crystal layers are of the twisted nematic type, and when a third polarizer (such as 30) is provided between them, an extremely high contrast is obtained which approaches the product of multiplication of the contrast values of each of the displays. If one has a value of say 10:1, and the other 15:1, the resulting contrast value is of the order of 150:1.

b. This makes possible the production of a twin liquid crystal display with good contrast and excellent light output if three slightly polarizing sheets of high transmittance are used.

Reference is made to our U.S. Pat. Nos. 4,294,524 and 4,410,887. A color or multicolor liquid crystal display of very high contrast can be obtained when a color or multicolor layer as defined in the above patents, is provided for in the space between the two thin glass sheets 29 and 32 of FIG. 3.

EXAMPLE 1

A device was constructed corresponding essentially to the construction illustrated in FIG. 2, with a surface area of the structure of 178×254 mm. The transparent plate 25 was a glass plate of 4.8 mm thickness, and this was covered with electrode strips 22, of 5 mm width. There was provided a plurality of printed spacers 16 to 21 of an area each of 0.5 mm×0.5 mm and height $8\mu$, the step between these being 6 mm. The twisted nematic liquid crystal layer 15 was $8\mu$ thick, and the width of the sealing frame 24 was 6 mm. The transparent electrode stripes 23 had a width of 5 mm and the transparent glass sheet 14 was 0.5 mm thick, while the transparent elastic rubber layer 13 was 0.6 mm thick and the transparent glass plate 12 was 4.8 mm thick. There was attained a close fit between the surfaces forming the boundary of the liquid crystal layer and these were maintained at a constant distance all over the surface of $8\mu$, giving a highly reliable performance.

EXAMPLE 2

A device was constructed according to FIG. 3, with a surface area of 52×56 mm. In this, 40 and 41, were conventional polarizers, 36 and 37 transparent glass plates of 1.3 mm thickness 26, 28, 33 and 35 transparent electrodes 0.8 mm wide; 27 and 34 twisted nematic liquid crystal layer of $10\mu$ thickness, 30 a conventional transmissive polarizer, and 31 a transparent elastic rubber layer of 0.3 mm thickness. The integrated structure shows an extremely high contrast of about 115:1 and a clear image without parallax when viewed from a wide range of viewing angles.

We claim:

1. A transparent substratum structure for use in the construction of large scale liquid crystal displays, said transparent substratum structure comprising:
   a transparent base plate;
   a transparent elastic layer, one side of said transparent elastic layer being hermetically bonded to one side of said transparent base plate; and
   a glass plate of a thickness of between 0.1 mm to 0.6 mm, said transparent base plate being of a sufficient thickness, greater than said thickness of said glass plate, to rigidify said glass plate, one side of said glass plate being hermetically bonded over its entire area to the other side of said transparent elastic layer, the other side of said glass plate being bonded to a liquid crystal layer provided with spacing means, said spacing means being supported by a base plate and by said other side of said glass plate and said glass plate being of sufficient thickness to adjust itself to follow an uneven contour of the liquid crystal layer resulting in a uniform thickness of said liquid crystal layer.

2. The substratum structure as claimed in claim 1, wherein a transparent elastic glud hermetically bonds said one side of said transparent base plate to said one side of said transparent electric layer and hermetically bonds said one side of said glass plate to said other side of said transparent elastic layer.

3. The substratum structure as claimed in claim 2, wherein the dimensions of said transparent substratum structure is about 10×10 cm and the thickness of said glass plate is between 0.2 mm to 0.5 mm.

4. The substratum structure as claimed in claim 2, further comprising transparent electrodes located on said other side of said glass plate.

5. The substratum structure as claimed in claim 1, wherein said other side of said glass plate is in close contact with a liquid crystal layer, said liquid crystal layer being supported by a glass sheet, spacing means defining the thickness of the liquid crystal layer being located between said other side of said glass plate and said glass sheet and electrodes located on the two surfaces facing said liquid crystal layer.

6. A large scale liquid crystal display, said liquid crystal display comprising:
   a first transparent sheet;
   a transparent elastic layer, one side of said transparent elastic layer being hermetically bonded to one side of said first transparent sheet;
   a glass plate of a thickness of between 0.1 mm and 0.6 mm, said first transparent sheet being of a sufficient thickness, greater than said thickness of said glass plate, to rigidify said glass plate, one side of said glass plate being hermetically bonded over its entire area to the other side of said transparent elastic layer;
   a second transparent sheet having an uneven surface;
   securing means for securing one side of said second transparent sheet to the other side of said glass plate; and
   a liquid crystal layer located between said second transparent sheet and said glass plate in contact with uneven surface of said second transparent sheet and said other side of said glass plate, said liquid crystal layer including
      a plurality of electrodes located spaced opposite one another contacting one of said uneven surface of said second transparent sheet and said other side of said glass plate and
      spacers located between said uneven surface of said second transparent sheet and said other side of said glass plate,
   said glass plate being of sufficient thickness to adjust to the contour of said liquid crystal layer as deformed by said uneven surface of said second transparent sheet so that said glass plate is in firm contact with said liquid crystal layer for uniform spacing between opposing electrodes and a resulting even thickness of said liquid crystal layer.

7. A large scale liquid crystal display as claimed in claim 6, wherein said plurality of electrodes are transparent.

8. A large scale liquid display as claimed in claim 6, wherein a transparent elastic glue hermetically bonds said one side of said first transparent sheet to said one side of said transparent elastic layer and hermetically bonds said one side of said glass plate to said other side of said transparent elastic layer.

9. A large scale liquid crystal display as claimed in claim 6, wherein the dimensions of said liquid crystal display is about 10×10 cm and the thickness of said glass plate is about 0.2 mm to 0.5 mm.

10. A large scale liquid crystal display as claimed in claim 6, wherein the dimensions of said liquid crystal display is about 10×10 cm and the thickness of said first transparent sheet is between 3 mm to 5 mm.

11. A large scale liquid crystal display as claimed in claim 6, wherein the dimensions of said liquid crystal display is about 20×30 cm and the thickness of said first transparent sheet is between 5 mm to 7 mm.

12. A large scale liquid crystal display as claimed in claim 6, wherein the thickness of said transparent elastic layer is between 0.4 mm to 0.7 mm.

13. A large scale liquid crystal display as claimed in claim 6, wherein the thickness of said liquid crystal layer is between $7\mu$ to $10\mu$.

14. A large scale liquid crystal display as claimed in claim 1, wherein the thickness of said liquid crystal layer is $8\mu$.

* * * * *

UNITED STATES PATENT AND TRADEMARK OFFICE
CERTIFICATE OF CORRECTION

PATENT NO. : 4,580,876
DATED : April 8, 1986
INVENTOR(S) : STOLOV et al

It is certified that error appears in the above-identified patent and that said Letters Patent are hereby corrected as shown below:

In column 5, line 26, delete "glud", and insert --glue--; and line 28, delete "electric", and insert --elastic--.

Signed and Sealed this

Fourteenth Day of October, 1986

[SEAL]

*Attest:*

DONALD J. QUIGG

*Attesting Officer*  *Commissioner of Patents and Trademarks*